Patented June 28, 1932

1,864,717

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

PROCESS OF MAKING SYNTHETIC AMMONIA FROM PETROLEUM REFINERY BY-PRODUCTS

No Drawing. Application filed December 15, 1921, Serial No. 522,494. Renewed July 17, 1928.

This invention relates to a process of treating petroleum still gases to yield hydrogen and unite with nitrogen to synthetic ammonia or ammonium compounds.

Gases from petroleum stills including those arising in normal distillation and those from cracking operations represent a considerable loss in oil and have little value save for their application as a fuel about the refinery.

The unsaturated portions from cracking stills especially the ethylene and propylene may be converted into alcohols through treatment with sulphuric acid and subsequent hydrolysis, however the olefins constitute only a small proportion of the total by-product gas.

The present invention has for its object the conversion of these waste gases into valuable ammonia products. The gases which may be employed may be the general run or mixture of gases arising from the various distillations of a petroleum refinery, however if desired the gases employed may be depleted in olefins through treatment with sulphuric acid or in any other suitable manner, such process not forming a part of the present invention. The fixed gases will generally be found to contain hydrogen, methane, ethane etc. and by passing this mixture of gases admixed with steam over a nickel catalyst heated to about 900° C. reaction will take place with the conversion of a good portion of the hydrocarbons to carbon dioxide and carbon monoxide. Preferably the operation is conducted to as completely as possible produce carbon dioxide instead of carbon monoxide but where this is not feasible a further addition of steam may be made and further treatment by passage over for example an iron catalyzer to convert the monoxide to the dioxide. Final traces of carbon monoxide may be removed to a very large extent by absorption under pressure in suitable absorbing agents such as copper formate or oxalate, the carbon dioxide being taken out by absorption under pressure in water or milk of lime solutions or solutions of caustic soda etc. The purpose of the operation is to produce as nearly pure hydrogen as possible practically free from oxygen, oxidizing agents and bodies such as sulphur which may have a poisoning action on the catalyzer hereinafter described employed for the production of synthetic ammonia.

It is an object of the invention to utilize in the refinery the raw materials which are normally present and particularly to make use of waste products or by-products so that synthetic ammonia may be manufactured comparatively cheaply. Thus in order to obtain nitrogen it may be produced by liquefaction of air the nitrogen being separated from the oxygen and incorporated with the hydrogen obtained as above or in any other suitable manner. The oxygen may be collected and packaged and shipped in cylinders under pressure or it may be used in an oil-cracking operation as will be hereinafter described.

If heavy oil is placed under pressure and heated to 400 or 500° C. and air is blown therethrough reaction takes place with the formation of various products of oxidation, the oxygen if allowed to travel through the oil at not too rapid a rate being practically completely absorbed, leaving the nitrogen incorporated with the products of the reaction. Thus by heating the oil to a cracking temperature or slightly below it and passing through a current of air the oil is converted gradually to gasoline and other oxidized condensable bodies and also fixed gases. The nitrogen yielded in this reaction may be used for reaction with hydrogen obtained as above thus making it possible through the agency of hydrocarbons in both instances to obtain hydrogen and nitrogen. It is also possible to add to the air current passing through the oil a quantity of steam, say from ten per cent and upwards by volume reckoned on the volume of air employed. The oxidation by the air current is an exothermic operation and if a large bulk of oil is being treated the temperature may rise undesirably high. The addition of steam has the advantage of cooling the liquid and preventing too high a temperature. At the same time reaction of the steam will occur to some extent with the production of hydrogen. A larger percentage of steam may be employed if some pure oxygen is admitted as for example oxygen obtained by the liquefaction method referred to above. The process may be carried out with suitable preheaters or heat interchangers so that the incoming current of air is heated considerably before contacting with the oil. The products of the operation are passed through condensers and finally may be treated with activated carbon or silica gel, preferably under pressure, to remove as far as possible the last portions of vapors carried in the current of fixed gases, the residual gases may be compressed and liquefied to remove most components with the exception of hydrogen and nitrogen. The mixture of the latter gases may be fortified with additional nitrogen or additional hydrogen obtained as above or from any other suitable source in order to bring the proportion of the mixed gases approximately to the ratio three volumes of hydrogen to one volume of nitrogen. The mixed gases should be in a pure condition and they may be purified either separately or in the admixed state by absorbing carbon dioxide, oxygen, carbon monoxide and catalyzer poisons. Moisture also is preferably removed. The mixed gases are brought to a pressure of many atmospheres which may range from below 100 up to 1000 atmospheres and are passed over a heated catalyst as for example fused or sintered metallic iron maintained at a temperature of about 500° C. in order to produce ammonia.

A further feature of the invention, in one form, is that of utilizing the diluted sulphuric acid which is available in a petroleum refinery and which is obtained from various sludges or from the hydrolysis operation employed in preparing alcohols and such diluted acid may be employed for the absorption of ammonia. It is in a form where it is of no value for petroleum refinery operations without re-concentrating but may be used for ammonia absorption without the necessity of such concentration. The gases which have passed through the absorbers to remove the ammonia may be passed on through driers and purifiers and again used in the cycle of the synthetic operation.

Thus it will be seen that the foregoing steps involve the utilization of refinery by-products and do not require a plant distilling petroleum and cracking oils to call upon sources of raw material foreign to its plant in order to produce the valuable by-products synthetic ammonia.

As an illustration of the process in one form the following will serve.

Pressure still gases from the condensers (and which may or may not be depleted in olefins by scrubbing with sulphuric acid in accordance with another process not a part hereof) are admixed with steam and passed over nickel catalyzer at 800° to 900° C. The hydrogen obtained is admixed with nitrogen obtained as follows:

The residues from the pressure stills which are not further amenable to cracking in the usual manner are run off into an oxidizer where they are subjected to the action of a preheated current of air at a pressure of 10 to 25 atmospheres. Oxidation of the residues with formation of additional gasoline and various water-soluble oxygen-containing liquids occurs. After removal of these, the nitrogen is collected, and after admixture with hydrogen is well purified.

A 3:1 mixture of this hydrogen and nitrogen is passed through a contact mass of sintered iron of high purity, the temperature being about 425° C. to 500° C. and the pressure 275 atmospheres. Leaving the contact mass the gases which now contain ammonia are passed into absorbers containing by-product sulphuric acid. The ammonia is absorbed to form ammonium sulphate and the unconverted gases are further utilized. The by-product sulphuric acid often contains nitrogenous substances which have been extracted from the oils or gases treated. These substances thus add to the sum total of available nitrogen. When the acid is saturated with ammonia, the liquor is evaporated to dryness or otherwise treated.

Thus gas oil may be treated in pressure stills to produce gasoline. The still gases are collected and serve as a source of hydrogen. The residues from the pressure stills are air-oxidized and additional gasoline obtained which may be blended with the pressure still gasoline. Nitrogen is separated and combined with the hydrogen. The purified mixture in 1:3 ratio is converted to ammonia which is absorbed in by-product sulphuric acid arising from the refining of the above gasoline. The interlocking features of this illustrative procedure indicate the manner in which the by-products of a petroleum refinery or distillation plant can be employed without seeking supplies of materials forign to the refinery, thus to obtain ammonia or ammonium compounds which heretofore have formed no part of the output of a refinery.

What I claim is:—

1. In the process of utilizing refinery by-products for the production of gaseous mixtures particularly adapted to the synthesis of ammonia, the steps of treating the oil with air and steam to produce a gaseous mixture containing nitrogen and hydrogen.

2. In the process of utilizing refinery by-products for the production of gaseous mixtures particularly adapted to the synthesis of ammonia, the step of treating the oil with air and steam to produce a gaseous mixture containing nitrogen and hydrogen but substantially free from oxygen.

3. In a process of utilizing refinery by-products, the steps which comprise treating oil to produce still gases therefrom and residues, converting the still gases into hydrogen, converting the residues from the oil treatment step into gases containing nitrogen, combining the hydrogen and nitrogen thus produced, and converting the mixture into ammonia.

4. In a process of utilizing refinery by-products, the steps which comprise still-treating petroleum to produce gases therefrom and residues, converting the gases into hydrogen, converting the residues from the petroleum treatment step into gases containing nitrogen, combining the hydrogen and nitrogen thus produced, and converting the mixture into ammonia.

5. In a process of utilizing refinery by-products wherein petroleum is treated to produce still gases therefrom and residues, the still gases are converted into hydrogen, the residues from the oil treatment step are converted into gases containing nitrogen, the nitrogen and hydrogen thus produced are combined and converted into ammonia, the step of passing a current of air through a body of oil heated to between 400 and 500° C. and under a pressure of about 250 pounds whereby nitrogen is obtained substantially free from oxygen.

CARLETON ELLIS.